(12) United States Patent
Muratani et al.

(10) Patent No.: US 8,233,616 B2
(45) Date of Patent: Jul. 31, 2012

(54) APPARATUS AND COMPUTER PROGRAM PRODUCT FOR PERFORMING DATA COMPRESSION PROCESSING USING ALGEBRAIC TORUS

(75) Inventors: Hirofumi Muratani, Kanagawa (JP); Tomoko Yonemura, Kanagawa (JP); Atsushi Shimbo, Tokyo (JP); Kenji Ohkuma, Kanagawa (JP); Taichi Isogai, Tokyo (JP); Yuichi Komano, Kanagawa (JP); Kenichiro Furuta, Tokyo (JP); Yoshikazu Hanatani, Tokyo (JP); Hanae Ikeda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 593 days.

(21) Appl. No.: 12/406,473

(22) Filed: Mar. 18, 2009

(65) Prior Publication Data
US 2010/0046742 A1    Feb. 25, 2010

(30) Foreign Application Priority Data
Aug. 25, 2008    (JP) .................................. 2008-216018

(51) Int. Cl.
*H04L 1/00*    (2006.01)
(52) U.S. Cl. .............................. 380/28; 380/43; 707/701
(58) Field of Classification Search .................... 380/28, 380/43
See application file for complete search history.

(56) References Cited

U.S. PATENT DOCUMENTS
6,792,108 B1 *    9/2004    Patera et al. .................... 380/43
2006/0072743 A1 *    4/2006    Naslund et al. ................. 380/28

OTHER PUBLICATIONS

Karl Rubin, et al., "Torus-Based Cryptography", CRYPTO 2003, Springer-Verlag, LNCS 2729, 2003, 16 Pages.
U.S. Appl. No. 13/225,964, filed Sep. 6, 2011, Hanatani, et al.

* cited by examiner

*Primary Examiner* — Nathan Flynn
*Assistant Examiner* — Phuoc Tran
(74) *Attorney, Agent, or Firm* — Oblon, Spivak, McClelland, Maier & Neustadt, L.L.P.

(57) ABSTRACT

An encryption processing unit executes an arithmetic operation decided in advance and outputs an arithmetic result as an element on an algebraic torus. A compressing unit outputs, when the arithmetic result is an exceptional point representing an element on the algebraic torus that cannot be compressed by a compression map for compressing an element on the algebraic torus into affine representation, a compression result obtained by compressing the arithmetic result according to the compression map and outputs, when the arithmetic result is the exceptional point, an element belonging to a specific set decided in advance that does not overlap a set to which a compression result obtained by compressing the arithmetic result, which is not the exceptional point, belongs.

8 Claims, 7 Drawing Sheets

APPARATUS AND COMPUTER PROGRAM PRODUCT FOR PERFORMING DATA COMPRESSION PROCESSING USING ALGEBRAIC TORUS

CROSS-REFERENCE TO RELATED APPLICATIONS

This application is based upon and claims the benefit of priority from the prior Japanese Patent Application No. 2008-216018, filed on Aug. 25, 2008; the entire contents of which are incorporated herein by reference.

BACKGROUND OF THE INVENTION

1. Field of the Invention

The present invention relates to an apparatus and a computer program product for executing processing for compressing data length using an algebraic torus in the same manner as the public key cryptography or the like that bases its safety on difficulty of the discrete logarithm problem defined on a subgroup of a multiplicative group of finite fields.

2. Description of the Related Art

The discrete logarithm problem is a problem for calculating "x" that satisfies $y=g^x$ when $y \in G$ is given in a cyclic group $G=<g>$. As the cyclic group G, a multiplicative group of finite fields and an additive group (a Jacobian group) formed by rational points of an elliptic curve is used. These problems are used to form a public key cipher. As an algorithm for solving these problems, there are an algorithm that can be applied to the discrete logarithm problem defined on any cyclic group such as the Schank's algorithm and the Pollard' $\rho$ method and an algorithm that can be applied to only the discrete logarithm problem defined on the multiplicative group of finite fields.

Because the order counting method is efficient, the public key cipher formed by using the discrete algorithm problem on the multiplicative group of finite fields is easily decoded. Therefore, to secure the same level of safety, the key length and the encrypted data length of the public key cipher formed by using the discrete logarithm problem on the multiplicative group of finite fields needs to be set larger than those of a public key cipher formed by using the discrete logarithm problem on the elliptic curve.

Therefore, the cipher compression technology for compressing a public key size and an encrypted data size in a public key cipher by using an algebraic torus is proposed (see, for example, K. Rubin and A. Silverberg "Torus-Based Cryptography", CRYPTO 2003, Springer LNCS 2729, 349-365, 2003). The algebraic torus is defined as a subgroup of the multiplicative group of finite fields. The algebraic torus can compress an original representation. This makes it possible to solve the problem that the key length and the encrypted data length in the public key cipher formed by using the discrete logarithm problem on the multiplicative group of finite fields are large.

For example, elements of a finite field represented by Formula (1) are represented as $(a_1, a_2, a_3, a_4, a_5, a_6)$ by using six components of a finite field represented by Formula (2). Note that $a_i$ (i–1 to 6) is an element of the finite field of Formula (2). On the other hand, a sixth order torus represented by Formula (3) is a cyclic group included in the finite field represented by Formula (1). Elements of the torus are represented by two components of the finite field represented by Formula (2). This representation is referred to as affine representation. In this way, when a key and an encrypted data of a public key cipher are elements of this torus, the length of the key and the encrypted data can be compressed to $\frac{1}{3}$.

$$F_{q^6} \tag{1}$$

$$F_q \tag{2}$$

$$T_6(F_q) \tag{3}$$

In the following explanation, the finite field represented by Formula (1) may be written as $F_{q^6}$.

However, an exceptional point representing an element that cannot be compressed into the affine representation is present in $T_6(F_q)$. The exceptional point cannot be represented the same as the other points. According to Rubin, although encryption fails when an exceptional point appears, because a probability of the appearance of the exceptional point is low, the probability can be neglected. However, in arithmetic operations such as multiplication, square, exponentiation, inverse element, and Frobenius map in the public key cipher, a normal point may be mapped to the exceptional point even if the probability is low. Therefore, the exceptional point is inevitably used as encrypted data and a public key.

If elements of the torus is represented by extension field representation or projective representation (explained in detail later), the problem does not occur because the exceptional point can also be represented. However, the effect of compression cannot be obtained because the representation is not the affine representation.

SUMMARY OF THE INVENTION

According to one aspect of the present invention, an information processing apparatus includes an arithmetic processing unit that executes an arithmetic operation decided in advance and outputs an arithmetic result as an element on an algebraic torus; and a compressing unit that outputs an element belonging to a specific set as a compression result of the arithmetic result, when the arithmetic result is an exceptional point representing an element on the algebraic torus that cannot be compressed by a compression map for compressing an element on the algebraic torus into affine representation, the specific set being decided in advance that does not overlap a set to which the compression result obtained by compressing the arithmetic result, which is not the exceptional point, according to the compression map belongs.

According to another aspect of the present invention, a computer program product has a computer readable medium including programmed instructions for performing information processing. The instructions, when executed by a computer, cause the computer to perform executing an arithmetic operation decided in advance and outputting an arithmetic result as an element on an algebraic torus; and outputting an element belonging to a specific set as a compression result of the arithmetic result, when the arithmetic result is an exceptional point representing an element on the algebraic torus that cannot be compressed by a compression map for compressing an element on the algebraic torus into affine representation, the specific set being decided in advance that does not overlap a set to which a compression result obtained by compressing the arithmetic result, which is not the exceptional point, according to the compression map belongs.

DETAILED DESCRIPTION OF THE INVENTION

Exemplary embodiments of an apparatus and a computer program product according to the present invention are explained in detail below with reference to the accompanying drawings.

In an example explained in a first embodiment of the present invention, an information processing apparatus according to the present invention is realized as an encryption apparatus or a decryption apparatus that configures a cipher processing system employing the public key cryptography using an algebraic torus. An apparatus to which the present invention can be applied is not limited to this. The present invention can be applied to any apparatus as long as the apparatus executes the processing for compressing data length using the algebraic torus.

In the cipher processing system according to the first embodiment, the encryption apparatus determines whether a target element, which is an element on a torus to be compressed into the affine representation, is an exceptional point. When the target element is the exceptional point, the encryption apparatus does not compress the target element and generates an encrypted data including information indicating that the target element is the exceptional point. The decryption apparatus decrypts the encrypted data based on the information indicating that the target element is the exceptional point.

Definitions and the like of terms used in this embodiment are explained below.

(Definition 1: field) When a ring k is a ring with respect to a set k* represented by Formula (4) excluding a zero element 0 (a unit element concerning the addition), the ring k is referred to as field. A field including a finite number of elements is referred to as finite field and represented as $F_q$ as explained above. Here, "q" is the number of elements and is referred to as order of the finite field. Further, "q" is a power of a prime number (a prime power). In other words, "q" is represented as $q=p^n$ by using a prime number "p" and a positive integer "n".

$$k^x = k \backslash \{0\} \tag{4}$$

(Definition 2: multiplicative group) When an arithmetic operation for a group G is multiplication, G is referred to as a multiplicative group.

(Definition 3: multiplicative group of fields) A set of elements other than 0 among elements of the field k forms a group with respect to the multiplication. This group is referred to as multiplicative group of the field k. A multiplicative group of finite fields $F_q$ includes the elements other than 0 and is represented by Formula (5).

$$F_q^x = F_q \backslash \{0\} \tag{5}$$

(Definition 4: affine space) A set $\{(a_1, a_2, \ldots, a_n) | a_1 \in k, a_2 \in k, \ldots, a_n \in k\}$ where k as a field is referred to as an nth order affine space on the field k and represented by Formula (6).

$$A^n(k) \tag{6}$$

(Definition 5: algebraic torus) An algebraic torus $T_n$ is defined as indicated by Formula (7).

$$T_n = \ker\left[\text{Res}_{L/k}G_m \xrightarrow[k \subseteq F \subseteq L]{\oplus N_{L/F}} \oplus \text{Res}_{F/k}G_m\right] \tag{7}$$

where, $G_m$ represents a map for mapping the field to a multiplicative group there of.

In the above, $\text{Res}_{K/k}$ is called Weil restriction of a scalar from a field K to a field k. Isomorphism represented by Formula (8) is established.

$$(\text{Res}_{K/k}G_m)(k) \cong G_m(K) = K^x \tag{8}$$

(Theorem 1) Theorems of Formula (9) and Formula (10) below are true.

$$T_n(k) \cong \{N_{L/F}(\alpha)=1 \text{ for all intermediates } F \text{ satisfying} \\ \alpha \in L^x | k \subset F \subseteq L\} \tag{9}$$

$$T_n(F_q) \cong \{x \in F_{q^n} | x^{\phi(n)}=1\}, (\phi \text{ is Euler function}) \tag{10}$$

(Definition 6: rational torus) T represents an algebraic torus in a dimension "d" on $F_q$. When birational map $\rho: T \to A_d$ is present, T is rational. In other words, when T is rational, a Zariski open subset $W \subset T$, $U \subset A^d(F_q)$ and rational functions $\rho_1, \ldots, \rho_d \in F_q(x_1, \ldots, x_t)$ and $\phi_1, \ldots, \phi_t \in F_q(y_1, \ldots, y_d)$ are present, $\rho=(\rho_1, \ldots, \rho_d): W \to U$ and $\phi=(\phi_1, \ldots, \phi_t): U \to W$.

(Example 1: rational parametrization of $T_6$) Set $f_2(x)=x^2+1$ as a second order irreducible polynomial on $F_{q^3}$, and x as a root of $f_2(x)=0$. $f_3(y)=y^3+w$ is set as a third order irreducible polynomial on $F_q$, and y as a root of $f_3(y)=0$. Here, $F_{q^3}=F_q(y)$ and $F_{q^6}=F_{q^3}(x)$. An $F_q$- base of $F_{q^3}$ is set as $\{\alpha_0=1, \alpha_1=y, \alpha_2=y^2\}$. Then, $\{1, y, y^2, x, xy, xy^2\}$ is an $F_q$- base of $F_{q^6}$. Further, $\sigma \in \text{Gal}(F_{q^6}/F_q)$ is an element of an order of 2. Specifically, Formula (11) is established. Further, $\psi_0$ represented by Formula (12) is defined by Formula (13).

$$\sigma: a \in F_{q^6} \mapsto a^{q^3} = a^{-1} \in F_{q^6} \tag{11}$$

$$\psi_0: A^3(F_q) F_{q^6}^x \tag{12}$$

$$\psi_0(u) = \frac{\gamma + x}{\gamma + \sigma(x)} \tag{13}$$

Here, $u=(u_0, u_1, u_2)$ and $\gamma$ is represented by Formula (14). Formula (16) is established based on Formula (15).

$$\gamma = \Sigma_{i=0}^2 u_i \alpha_i = u_0 + u_1 y + u_2 y^2 \tag{14}$$

$$f_2(x) = x^2+1=0 \text{ and } x \in F_{q^2} \backslash F_q \tag{15}$$

$$\sigma(x) = x^{q^3} = -x \tag{16}$$

1. When Formula (17) and Formula (18) are used, Formula (19) is true for all $u=(u_1, u_2, u_3)$.

$$\gamma^{q^3} = \gamma \quad (17)$$

$$\sigma(x) = x^{q^3} \quad (18)$$

$$N_{F_{q^6}/F_{q^3}}(\psi_0(u)) = \psi_0(u)^{q^3+1}$$
$$= \left(\frac{\gamma + x}{\gamma + \sigma(x)}\right)^{q^3+1}$$
$$= \left(\frac{\gamma + x}{\gamma + \sigma(x)}\right)\left(\frac{\gamma + \sigma(x)}{\gamma + x}\right)$$
$$= 1 \quad (19)$$

2. When U is defined by Formula (20), Formula (21) is true. According to a theorem 90 of Hilbert, all elements of $T_6(F_q)-\{1\}$ are included in an image of $\phi 0$. Therefore, Formula (22) is true.

$$U = \{u \in A^3 \mid N_{F_{q^6}/F_{q^2}}(\psi_0(u)) = 1\} \quad (20)$$

$$\psi_0(u) \in T_6(F_q) \Leftrightarrow u \in U \quad (21)$$

$$\psi_0 : U \tilde{\to} T_6 - \{1\} \quad (22)$$

An equation defining U is Formula (23). Therefore, when the formula is solved, Formula (24) is obtained.

$$N_{F_{q^6}/F_{q^2}}(\psi_0(u)) = \psi_0(u)^{(q^6-1)/(q^2-1)} \quad (23)$$
$$= \psi_0(u)^{q^2-q+1}$$
$$= \left(\frac{\gamma + x}{\gamma + \sigma(x)}\right)^{q^2-q+1}$$
$$= 1$$

$$\gamma^{q^2+q} + \gamma^{q^2+1} + \gamma^{q+1} - 1 = 0 \quad (24)$$

When $\gamma = u_0 + u_1 y + u_2 y^2$ is substituted in Formula (24), Formula (25) is obtained.

$$\gamma^{q^2+q} + \gamma^{q^2+1} + \gamma^{q+1} = 3(u_0^2 - u_1 u_2 w) = 1 \quad (25)$$

When $u_1 \neq 0$, Formula (26) is true. Therefore, $U|u_1 \neq 0$ is parametrized by $u_0$ and $u_1$ satisfying Formula (27). On the other hand, when $u_1 = 0$, $u_0^2 = 1/3$. Here, q is selected so that 3 is a quadratic non-residue of $F_q$.

$$u_2 = \frac{3u_0^2 - 1}{3u_1 w} \quad (26)$$

$$(u_0, u_1) \in F_q \times F_q^x \quad (27)$$

Here, $U|u_1 \neq 0$ is an empty set because $u_0^2 = 1/3$ does not have a solution. Therefore, $U = U|u_1 \neq 0$ is parametrized by $u_0$ and $u_1$ satisfying the Formula (27).

Therefore, a map "g" represented by Formula (28) is defined by Formula (29).

$$g : F_q \times F_q^x \to U \quad (28)$$

$$g(u_0, u_1) = \left(u_0, u_1, \frac{2u_0^2 - 1}{3u_1 w}\right) \quad (29)$$

(Definition 7: projective representation) Formula (30) is referred to as projective representation of $T_6(F_q)$. When $\alpha$ and $\beta$ satisfy the condition of Formula (30), the projective representation is simplified like $(\alpha, \beta)$.

$$T_6(F_q) = \quad (30)$$
$$\left\{\frac{\alpha + \beta x}{\alpha + \beta \sigma(x)} \mid (\alpha, \beta) \in A^2(F_{q^3}) \setminus \{(0, 0)\}, N_{F_{q^6}/F_{q^2}}\left(\frac{\alpha + \beta x}{\alpha + \beta \sigma(x)}\right) = 1\right\}$$

(Definition 8: affine representation) Formula (31) is referred to as affine representation of $T_6(F_q)$. When $u_0$ and $u_1$ satisfy the condition of Formula (31), the affine representation is simplified like $(u_0, u_1)$.

$$T_6(F_q)\setminus\{1\} = \left\{\frac{u_0 + u_1 y + \frac{3u_0^2-1}{3u_1 w} y^2 + x}{u_0 + u_1 y + \frac{3u_0^2-1}{3u_1 w} y^2 + \sigma(x)} \;\middle|\; (u_0, u_1) \in F_q \times F_q^x\right\} \quad (31)$$

(Definition 9: exceptional point and normal point) Rational map $\phi$ from an affine space $A^2(F_q)$ to an algebraic torus $T_6(F_q)$ and inverse map $\rho$ of the rational map $\phi$ are defined as indicated by Formula (32).

$$\psi : A^2(F_q)\setminus V(f) \tilde{\to} T_6(F_q)\setminus\{1\} \quad (32)$$

$$(c_1, c_2) \mapsto \frac{u_0 + u_1 y + \frac{3u_0^2-1}{3u_1 w} y^2 + x}{u_0 + u_1 y + \frac{3u_0^2-1}{3u_1 w} y^2 + \sigma(x)}$$

$$p : T_6(F_q)\setminus\{1\} \tilde{\to} A^2(F_q)\setminus V(f)$$

$$\frac{\alpha + \beta x}{\alpha + \beta \sigma(x)} \mapsto (u_0, u_1) \text{ where } \frac{\alpha}{\beta} = u_0 + u_1 y + u_2 y^2$$

Here, $1 \in T_6(F_q)$ is referred to as exceptional point. Such exceptional points 1 and $\Psi_0(a)$ cannot be compressed by the map $\rho$. An element of $T_6(F_q)$ other than the exceptional points is referred to as normal point. The normal point can be represented as an element of $A^2(F_q)$ by the map $\rho$. In other words, the normal point can be compressed to $1/3$ length.

Figure 1:
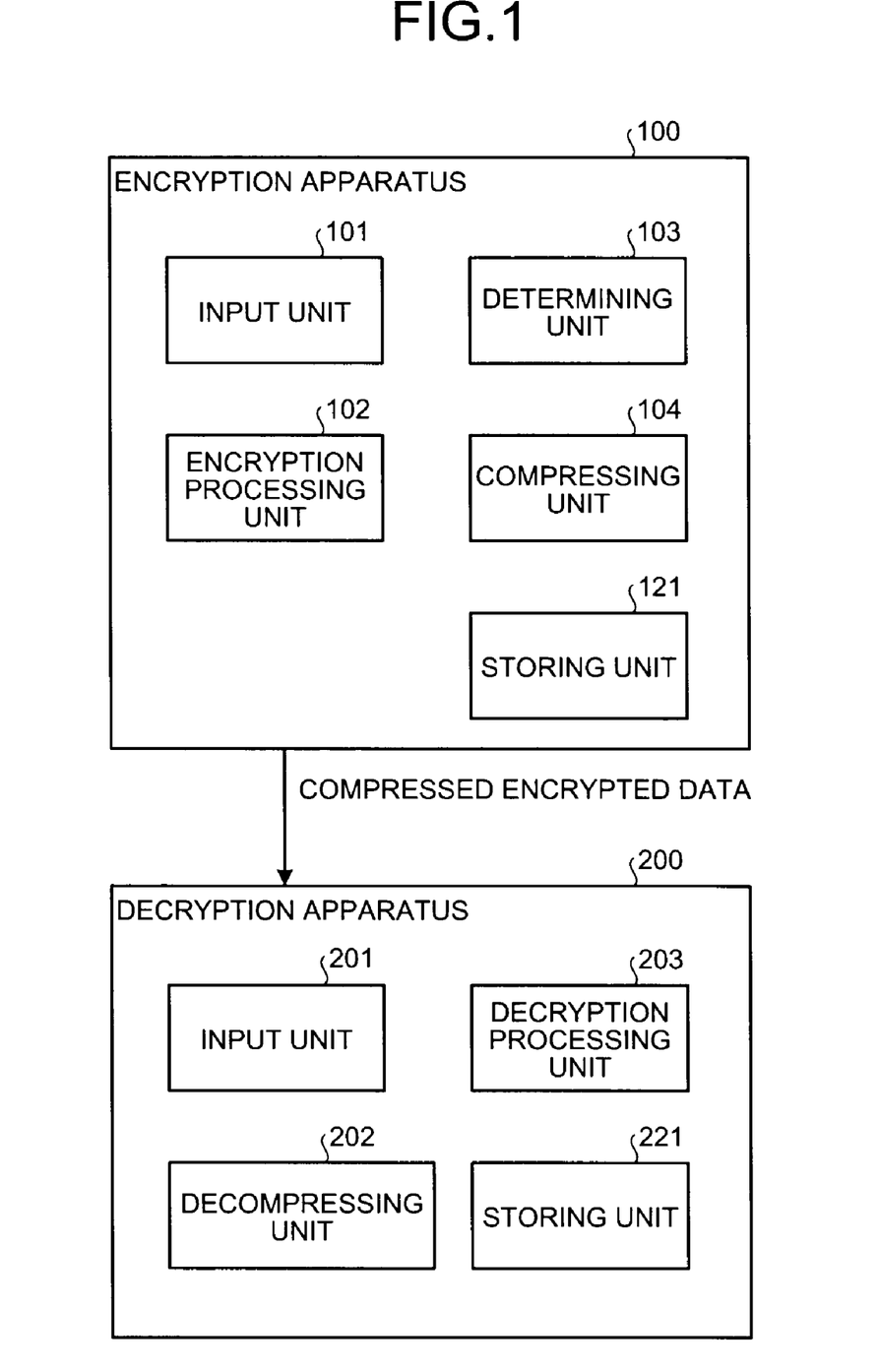
FIG. 1 is a block diagram of a cipher processing system according to a first embodiment of the present invention.

A configuration of a cipher processing system according to the first embodiment is explained. As shown in FIG. 1, the cipher processing system according to the first embodiment includes an encryption apparatus 100 and a decryption apparatus 200.

The encryption apparatus 100 is an apparatus that encrypts a plain data in the public key cryptography using an algebraic torus. The encryption apparatus 100 includes an input unit 101, an encryption processing unit 102, a determining unit 103, a compressing unit 104, and a storing unit 121.

The input unit 101 receives an input of plain data, encryption key data of the public key cryptography used for encryption (hereinafter, "public key data"), and the like. The storing unit 121 stores the input plain data, public key data, and the like.

The encryption processing unit 102 functions as an arithmetic processing unit that outputs an arithmetic result as an element on an algebraic torus by executing an arithmetic operation decided in advance. Specifically, the encryption processing unit 102 applies, using the public key data, encryption processing based on the discrete logarithm problem on finite fields to the plain data and outputs encrypted data including a plurality of elements. More specifically, the encryption processing unit 102 applies, using a plurality of times of exponentiation or multiplication or a hash function H that uses the encrypted data as an input value, encryption processing to the plain data and outputs encrypted data according to the ElGamal cryptography or the Cramer-Shoup cryptography as the encryption system based on the discrete logarithm problem on finite fields. In the following explanation, it is assumed that the encryption processing unit 102 encrypts the plan data in the Cramer-Shoup cryptography.

Figure 2:
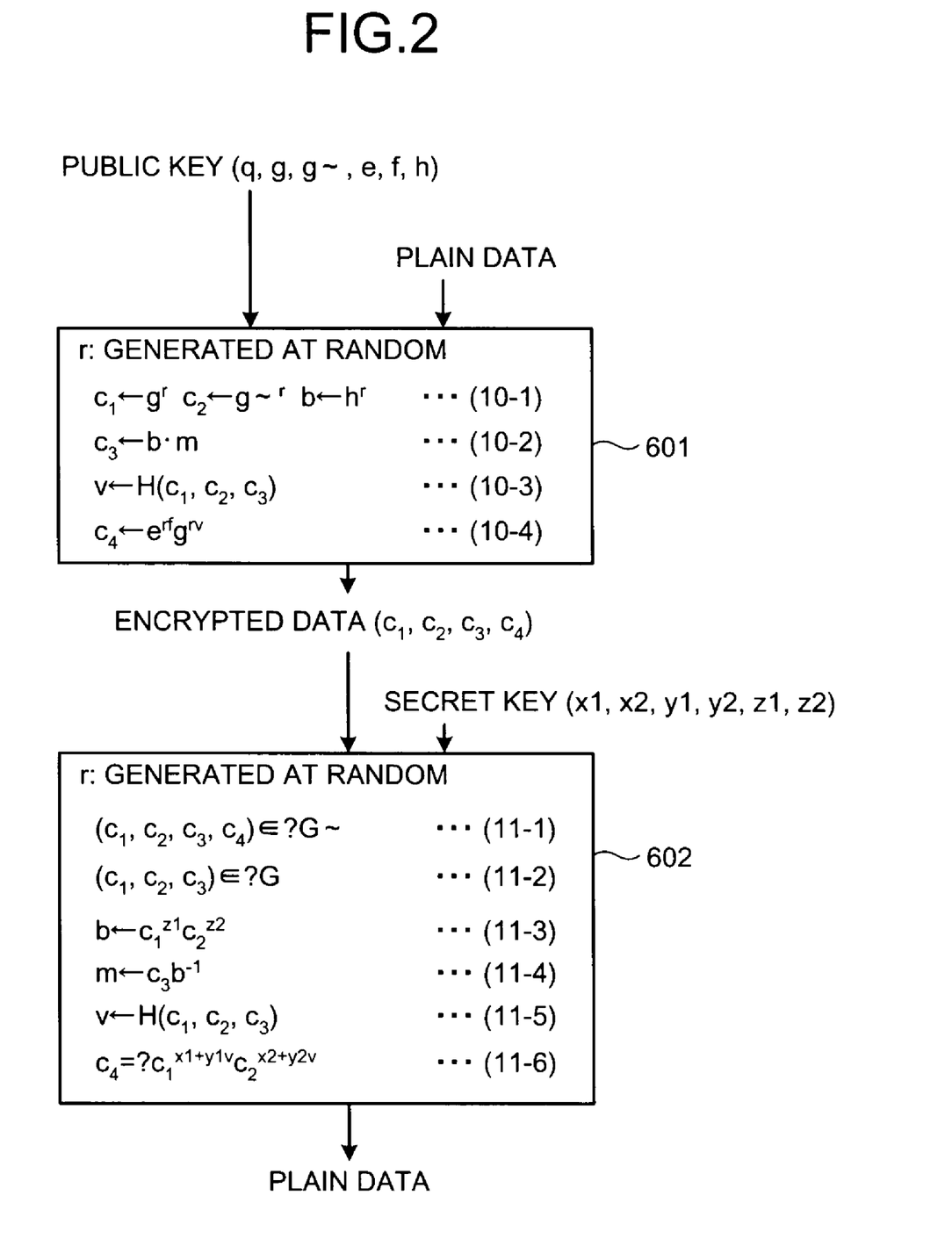
FIG. 2 is a diagram for explaining encryption and decryption of the Cramer-Shoup cryptography.

The Cramer-Shoup cryptography is explained. In FIG. 2, "q" represents a prime number, "g" represents a generated element of the group G (an order is q) with which a cipher is defined, and "g~", "e", "f", and "h" represent elements of the group G. Plain data "m" is also an element of the group G. Here, "r" represents a random number generated at random.

In encryption processing 601, the encryption processing unit 102 calculates encrypted data ($c_1$, $c_2$, $c_3$, $c_4$) corresponding to the plain data "m" according to Formulas (10-1) to (10-4). In Formula (10-3), H indicates a hash function. The encryption processing unit 102 inputs the encrypted data to the hash function H to calculate a hash value "v". It is assumed that a secret key is an integer from 1 to q (or an integer from 0 to q−1).

In decryption processing 602, the encryption processing unit 102 checks whether the plain data is correct based on a secret key (x1, x2, y1, y2, z1, z2) and the encrypted data ($c_1$, $c_2$, $c_3$, $c_4$), and calculates the plain data "m" according to Formulas (11-1) to (11-6). The secret key (x1, x2, y1, y2, z1, z2) is an integer from 1 to q. Further, $c \in^? G$ (or G~) indicates that it is determined whether "c" belongs to the group G (or the group G~).

In this way, the encryption processing unit 102 outputs the encrypted data $c_1$, $c_2$, $c_3$, and $c_4$ including the four elements according to the Cramer-Shoup cryptography. Each of $c_1$, $c_2$, $c_3$, and $c_4$ is element of an algebraic torus. In the case of the extension field representation, the elements are represented as $a_1+a_2x+a_3y+a_4xy+a_5((y^2-2)+a_6x(y^2-2)$. Here, "$a_i$" is an element of $F_q$. As explained above, in the extension field representation, the elements may be represented as ($a_1$, $a_2$, $a_3$, $a_4$, $a_5$, $a_6$) by using only $a_i$.

In the example explained in this embodiment, the encryption processing unit 102 outputs encrypted data represented in projective representation. This makes it possible to reduce conversion processing, which requires large processing cost, between the extension field representation and the projective representation as much as possible and reduce cost for arithmetic processing concerning encryption. When encrypted data represented in the extension field representation is output, a method same as the method according to this embodiment can be applied. The encryption processing unit 102 is an example of an arithmetic processing unit. The encryption processing unit 102 can be configured to execute arithmetic processing other than the encryption processing as long as the encryption processing unit 102 outputs an element on an algebraic torus as an arithmetic result.

An element of the encrypted data is an element on an algebraic torus as a target of compression by the compressing unit 104 explained later (a target element).

The determining unit 103 determines whether an element included in the encrypted data output by the encryption processing unit 102 is an exceptional point on the algebraic torus (exceptional point 1).

The compressing unit 104 outputs compressed encrypted data obtained by compressing encrypted data according to a cipher compression technology using an algebraic torus such as Rubin. Specifically, the compressing unit 104 compresses an element of the encrypted data, which is determined as not being an exceptional point by the determining unit 103, from the projective representation to the affine representation according to the birational map ρ. The compressing unit 104 generates a compression result (processing result) including the compressed affine representation.

Concerning an element determined as being an exceptional point by the determining unit 103, the compressing unit 104 outputs, as affine representation corresponding to the exceptional point, an element belonging to a specific set decided in advance. Specifically, the compressing unit 104 outputs, as affine representation representing a compression result corresponding to the exceptional point, an element belonging to a specific set represented by Formula (33). In the formula, "m" is a positive integer which satisfies $q=p^m$.

$$A^2(F_{p^m}) \backslash \Psi(T_6(F_{p^m}) \backslash \{1\}) \tag{33}$$

Figure 3:
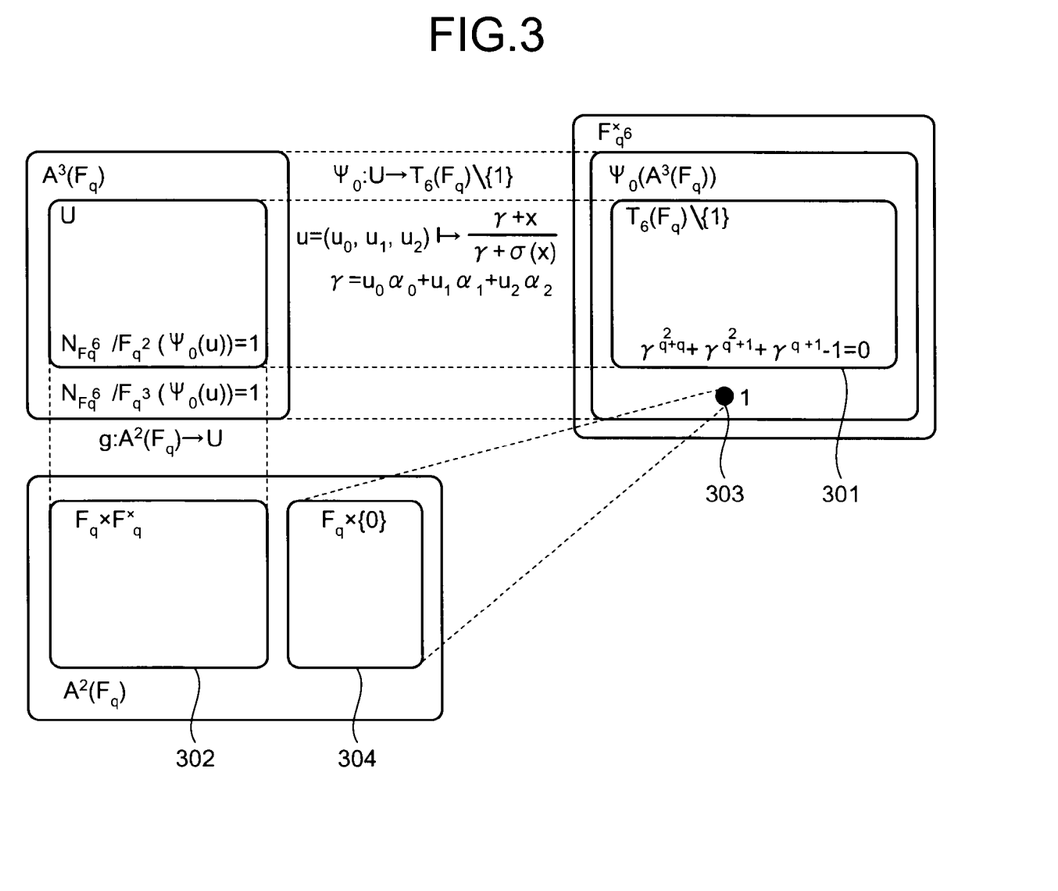
FIG. 3 is a diagram representing a relation between a specific set and map.

A relation between the specific set and the inverse map φ of the birational map ρ is explained with reference to FIG. 3. As explained in (Example 1: rational parametrization of $T_6$), elements on an algebraic torus excluding the exceptional point 1 (an element of $T_6(F_q)-\{1\}$) are parametrized by $u_o$ and $u_1$ satisfying Formula (27). In FIG. 3, it is shown that a set 302 included in the two-dimensional affine space $A^2(F_q)$ is associated with a set 301 by maps "g" and Ψ.

In this embodiment, an element 303 representing the exceptional point 1 is associated with an element belonging to a set 304 obtained by excluding the set 302 from the two-dimensional affine space $A^2(F_q)$. In other words, the compressing unit 104 outputs an element belonging to the set 304 as affine representation corresponding to the exceptional point 1. This makes it possible to represent the exceptional point 1 in affine representation that does not overlap affine representation for a normal point.

The compressing unit 104 receives projective representation indicated by Formula (34) as an input and outputs affine representation indicated by Formula (35) to thereby convert projective representation including the exceptional point 1 into affine representation. Specifically, the compressing unit 104 converts the projective representation into the affine representation according to a procedure indicated by Formula (36). As indicated by Formula (30), when β=0, α+βx/(α+βσ(x))=α/α=1, which corresponds to the exceptional point 1. Therefore, when it is determined β=0 in a procedure 1 of Formula (36), i.e., when it is determined that the projective representation is the exceptional point 1, the compressing unit 104 sets values of $u_0$ and $u_1$ of Formula (31) to a zero element of $F_{p^m}(F_q)$. This means that the compressing unit 104 converts the exceptional point 1 into an element of the set 304 in FIG. 3, i.e., affine representation represented by the zero element.

$$(\alpha, \beta) \in T_6(F_{p^m}) : \alpha = (a_0, a_1, a_2), \quad (34)$$
$$\beta = (b_0, b_1, b_2) \in F_{(p^m)^3}, a_i,$$
$$b_i \in F_{p^m}$$

$$(u_0, u_1) \in T_6(F_{p^m}) : u_0 \in F_{p^m}, u_1 \in F_{p^m} \quad (35)$$

$$\begin{cases} 1. \text{ if } \beta = 0_{F_{(p^m)^3}} \text{ then} & (36) \\ \quad 1.1 \ u_0 := 0_{F_{p^m}} \in F_{p^m}. \\ \quad 1.2 \ u_1 := 0_{F_{p^m}} \in F_{p^m}. \\ 2. \text{ else} \\ \quad 2.1 \text{ calculate } \gamma := \alpha \cdot \beta^{-1} \in F_{(p^m)^3} \text{ and} \\ \quad 2.2 \text{ obtain } (u_0, u_1) \text{ from } \gamma := u_0 + u_1 y + u_2 y^2 \in F_{(p^m)^3} \end{cases}$$

A method of calculating $(u_0, u_1)$ for the exceptional point 1 is not limited to this. Any method can be applied as long as the method is a method for calculating an element belonging to the set 304.

The compressing unit 104 outputs, as compressed encrypted data, processing results generated for the elements of the encrypted data in this way. The output compressed encrypted data is transmitted to the decryption apparatus 200 by a transmitting and receiving unit (not shown) that transmits and receives data between the encryption apparatus 100 and an external apparatus.

The decryption apparatus 200 is an apparatus that restores encrypted data encrypted in the public key cryptography using an algebraic torus. The decryption apparatus 200 includes an input unit 201, a decompressing unit 202, a decryption processing unit 203, and a storing unit 221.

The input unit 201 receives an input of compressed encrypted data transmitted from the encryption apparatus 100, secret key data of the public key cryptography used for decryption, and the like. The storing unit 221 stores the input, compressed encrypted data, secret key data, and the like.

The decompressing unit 202 decompresses encrypted data compressed by the cipher compression technology using an algebraic torus. Specifically, the decompressing unit 202 decompresses elements of the encrypted data from the affine representation to the projective representation according to the inverse map $\phi$ of the birational map $\rho$. In the following explanation, the inverse map $\phi$ is referred to as decompression map.

Details of a decompression map with which the decompressing unit 202 converts affine representation into projective representation are explained. The decompression map is a map for receiving affine representation indicated by Formula (37) as an input and outputs projective representation indicated by Formula (38). Specifically, the decompression map is a map for reading, according to a procedure indicated by Formula (39), Formula (31), which is a fractional expression of the affine representation, as Formula (30), which is a fractional expression of the projective expression, to thereby convert affine representation into projective representation. Procedures 5 and 6 of Formula (39) indicates that values of $b_1$ and $b_2$ are set to a zero element of $F_{p^m}$.

$$(u_0, u_1) \in T_6(F_{p^m}) : u_0 \in F_{p^m}, u_1 \in F_{p^m} \quad (37)$$

$$(\alpha, \beta) \in T_6(F_{p^m}) : \alpha = (a_0, a_1, a_2), \quad (38)$$
$$\beta = (b_0, b_1, b_2) \in F_{(p^m)^3}, a_i,$$
$$b_i \in F_{p^m}$$

$$\begin{cases} 1. \ a_0 := u_0 u_1 \in F_{p^m}. & (39) \\ 2. \ a_1 := u_1^2 \in F_{p^m} \\ 3. \ a_2 := (u_0^2 - 3^{-1}) w^{-1} \in F_{p^m}. \\ 4. \ b_0 := u_1 \in F_{p^m}. \\ 5. \ b_1 := 0_{F_{p^m}} \in F_{p^m}. \\ 6. \ b_2 := 0_{F_{p^m}} \in F_{p^m}. \end{cases}$$

According to such decompression map, the decompressing unit 202 can convert the affine representation represented by the element (the zero element) belonging to the set 304 in FIG. 3 into the exceptional point 1.

The decryption processing unit 203 applies decryption processing based on the discrete logarithm problem on finite fields to each of the elements of the encrypted data decompressed by the decompressing unit 202 using the secret key data stored in the storing unit 221 and outputs plain data. Specifically, the decryption processing unit 203 applies, using a plurality of times of exponentiation or multiplication or a hash function that uses the encrypted data as an input value, the decryption processing to the encrypted data according to the ElGamal cryptography or the Cramer-Shoup cryptography.

The storing unit 121 of the encryption apparatus 100 and the storing unit 221 of the decryption apparatus 200 can be any kinds of generally-used storage media such as a Hard Disk drive (HDD), an optical disk, a memory card, and a random access memory (RAM).

The encryption processing by the encryption apparatus 100 according to the first embodiment is explained with reference to FIG. 4.

The encryption apparatus 100 receives inputs of public key data and plain data in advance and stores the public key data and the plain data in the storing unit 121 or the like.

The encryption processing unit 102 generates a random number "r" as shown in FIG. 2 (Step S401). Subsequently, the encryption processing unit 102 executes, using g~, e, and f included in the public key data, exponentiation and multiplication using the generated random number "r" as a multiplier and calculates $c_1$ and $c_2$ as elements of the encrypted data (Step S402). The encryption processing unit 102 processes a plain data with the multiplication and calculates $c_3$ as an element of the encrypted data (Step S403).

The encryption processing unit 102 performs hash calculation using "e" and "f" included in the public key data and the random number to calculate a hash value "v" (Step S404). The encryption processing unit 102 performs exponentiation using the calculated hash value "v" as a multiplier to calculate $c_4$ as an element of the encrypted data (Step S405). The encryption processing unit 102 outputs the calculated encrypted data $(c_1, c_2, c_3, c_4)$ (Step S406).

The determining unit 103 acquires unprocessed elements among elements of the received encrypted data (Step S407). The determining unit 103 determines whether the acquired element of the encrypted data is the exceptional point 1 (Step S408).

When the element of the encrypted data is not the exceptional point 1, i.e., when the element is a normal point (No at Step S408), the compressing unit 104 compresses the element of the encrypted data according to the birational map p and generates affine representation (Step S409). The compressing unit 104 outputs the element of the compressed encrypted data compressed into the affine representation (Step S410).

When it is determined in Step S408 that the element is the exceptional point 1 (Yes at Step S408), the compressing unit 104 outputs the element of the compressed encrypted data compressed in the affine representation represented by an element of a specific set (Step S411). Specifically, the compressing unit 104 outputs, as the element of the compressed encrypted data, affine representation (u0, u1)=(0, 0) included in the set 304 in FIG. 3.

The compressing unit 104 determines whether all elements of the encrypted data have been processed (Step S412). When all the elements have not been processed (No at Step S412), the encryption apparatus 100 acquires the next unprocessed element and repeats the processing (Step S407). When all the elements have been processed (Yes at Step S412), the encryption apparatus 100 finishes the encryption processing.

Figure 5:
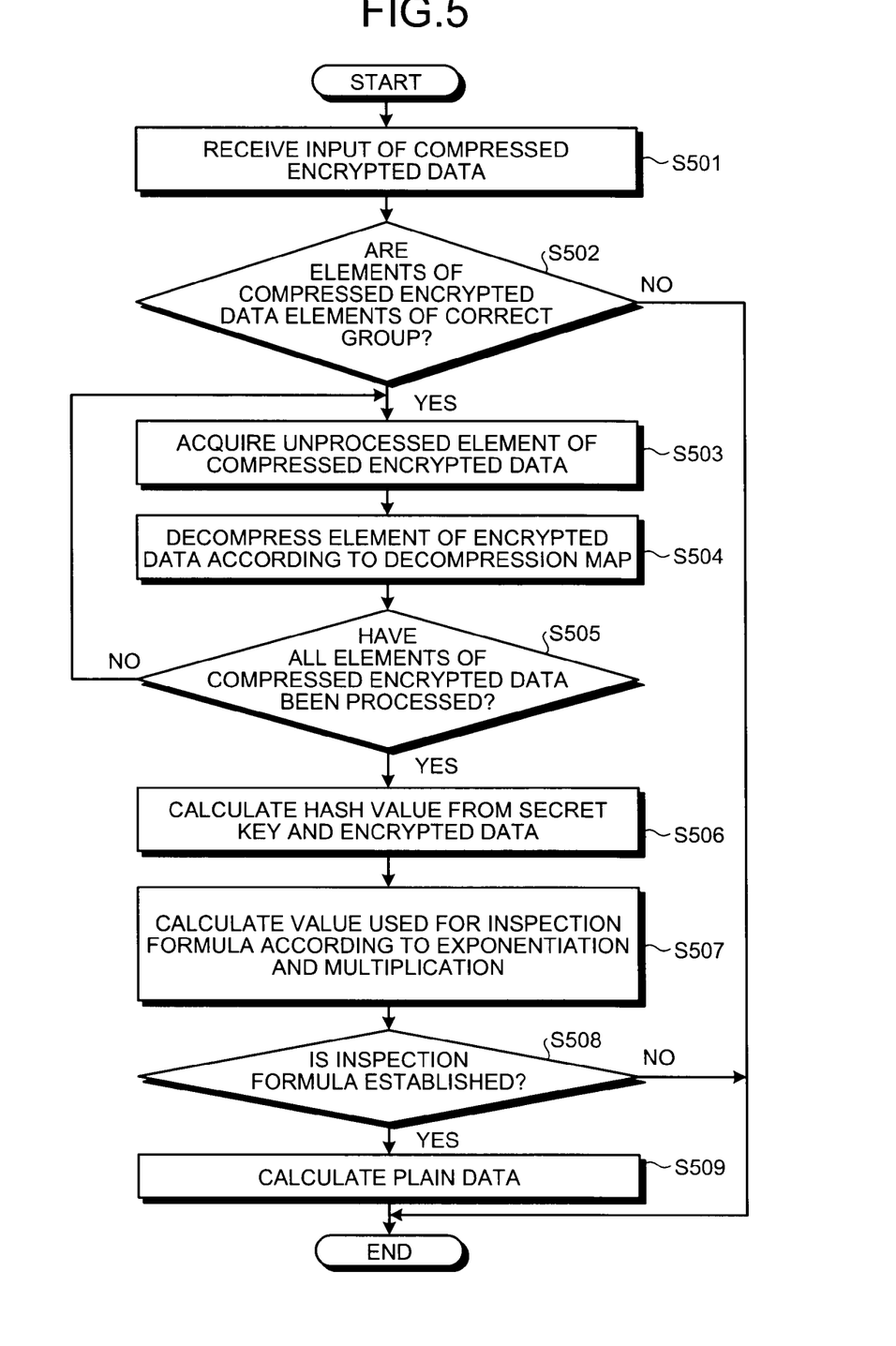
FIG. 5 is a flowchart of an overall flow of decryption processing in the first embodiment.

Decryption processing by the decryption apparatus 200 according to the first embodiment is explained with reference to FIG. 5.

The decryption apparatus 200 receives in advance an input of secret key data corresponding to the public key data used for compression by the encryption apparatus 100 and stores the secret key data in the storing unit 221 or the like.

First, the input unit 201 receives an input of compressed encrypted data as a target of decryption (Step S501). For example, the input unit 201 receives, from the storing unit 221, an input of the compressed encrypted data transmitted from the encryption apparatus 100 and stored in the storing unit 221.

Subsequently, the decryption processing unit 203 checks whether elements of the input compressed encrypted data are elements of a correct group (Step S502). Specifically, the decryption processing unit 203 checks whether the elements belong to a group G or a group G~ as indicated by (11-1) and (11-2) in FIG. 2.

When the elements of the compressed encrypted data are not the elements of the correct group (No at Step S502), the decryption processing unit 203 finishes the decryption processing. When the elements of the compressed encrypted data are the elements of the correct group (Yes at Step S502), the decompressing unit 202 acquires an unprocessed element among the elements of the compressed encrypted data (Step S503).

The decompressing unit 202 decompresses the element of the compressed encrypted data according to the decompression map (Step S504). Specifically, the decompressing unit 202 decompresses elements of the compressed encrypted data to projective representation according to the decompression map indicated by Formulas (37) to (39).

Subsequently, the decompressing unit 202 determines whether all the elements of the compressed encrypted data have been processed (Step S505). When all the elements have not been processed (No at Step S505), the decompressing unit 202 acquires the next element and repeats the processing (Step S503).

When all the elements have been processed (Yes at Step S505), as explained below, the decryption processing unit 203 decrypts the decompressed encrypted data into plain data (Steps S506 to S509). When all the elements have been decompressed, encrypted data ($c_1$, $c_2$, $c_3$, $c_4$) is obtained.

First, the decryption processing unit 203 calculates a hash value "v" according to a hash function using the elements $c_1$, $c_2$, and $c_3$ of the encrypted data and the secret key data (Step S506). Subsequently, the decryption processing unit 203 calculates a value used for an inspection formula according to exponentiation and multiplication using the hash value "v", the elements $c_1$ and $c_2$ of the encrypted data, and the secret key data (Step S507). Specifically, the decryption processing unit 203 calculates a value on the right side of an inspection formula of (11-6) in FIG. 2.

Subsequently, the decryption processing unit 203 determines whether the inspection formula is satisfied, i.e., whether the calculated value and the element $c_4$ of the encrypted data coincide with each other (Step S508). When the inspection formula is not satisfied (No at Step S508), the decryption processing unit 203 finishes the decryption processing.

When the inspection formula is satisfied (Yes at Step S508), as indicated by (11-3) and (11-4) in FIG. 2, the decryption processing unit 203 executes exponentiation using the elements $c_1$ and $c_2$ of the encrypted data and secret key data z1 and z2 and executes multiplication using a value obtained by the exponentiation and the element $c_3$ of the encrypted data to decrypt plain data "m" (Step S509).

The decryption processing unit 203 executes, after converting elements of the encrypted data represented in the affine representation into projective representation, processing such as calculation of a hash value and inspection of an inspection formula. The decryption processing unit 203 can be configured to execute the processing such as calculation of a hash value and inspection of an inspection formula in the affine representation. For example, the decryption processing unit 203 can determine whether an inspection value calculated in the affine representation and the element $c_4$ of the encrypted data represented in the affine representation coincide with each other. In such a case, if both the values to be compared belong to the set 304 in FIG. 3, the decryption processing unit 203 needs to determine that both the values coincide with each other. This is because both the values in the affine representation belonging to the set 304 correspond to the exceptional point 1 in the projective representation or the extension field representation.

As explained above, in the cipher processing system according to the first embodiment, when an element on a torus to be compressed to affine representation is an exceptional point, the encryption apparatus outputs an element belonging to a specific set as affine representation corresponding to the exceptional point. The decryption apparatus can decompress the affine representation according to the decompression map same as that for affine representation to which a normal point as an element other than the exceptional point is converted. Therefore, even when an exceptional point that cannot be compressed by the processing for compressing data length using an algebraic torus appears, it is possible to appropriately execute the processing.

In the method in the past, when an exceptional point appears, in some case, an arithmetic result is discarded and a target element is recalculated. Such a waste of processing can be eliminated. In the recalculating method, time until the completion of processing cannot be guaranteed. However, according to this embodiment, time until the completion of the arithmetic processing can be guaranteed.

In a cipher processing system according to a second embodiment of the present invention, the encryption apparatus executes, using, as a zero element, an inverse element of a zero element of a predetermined finite field representing an element on an algebraic torus, processing for conversion from projective representation into affine representation. This makes it unnecessary to perform, in the conversion processing, processing for determining whether an element on a torus represented in the projective representation is an exceptional point.

Figure 6:
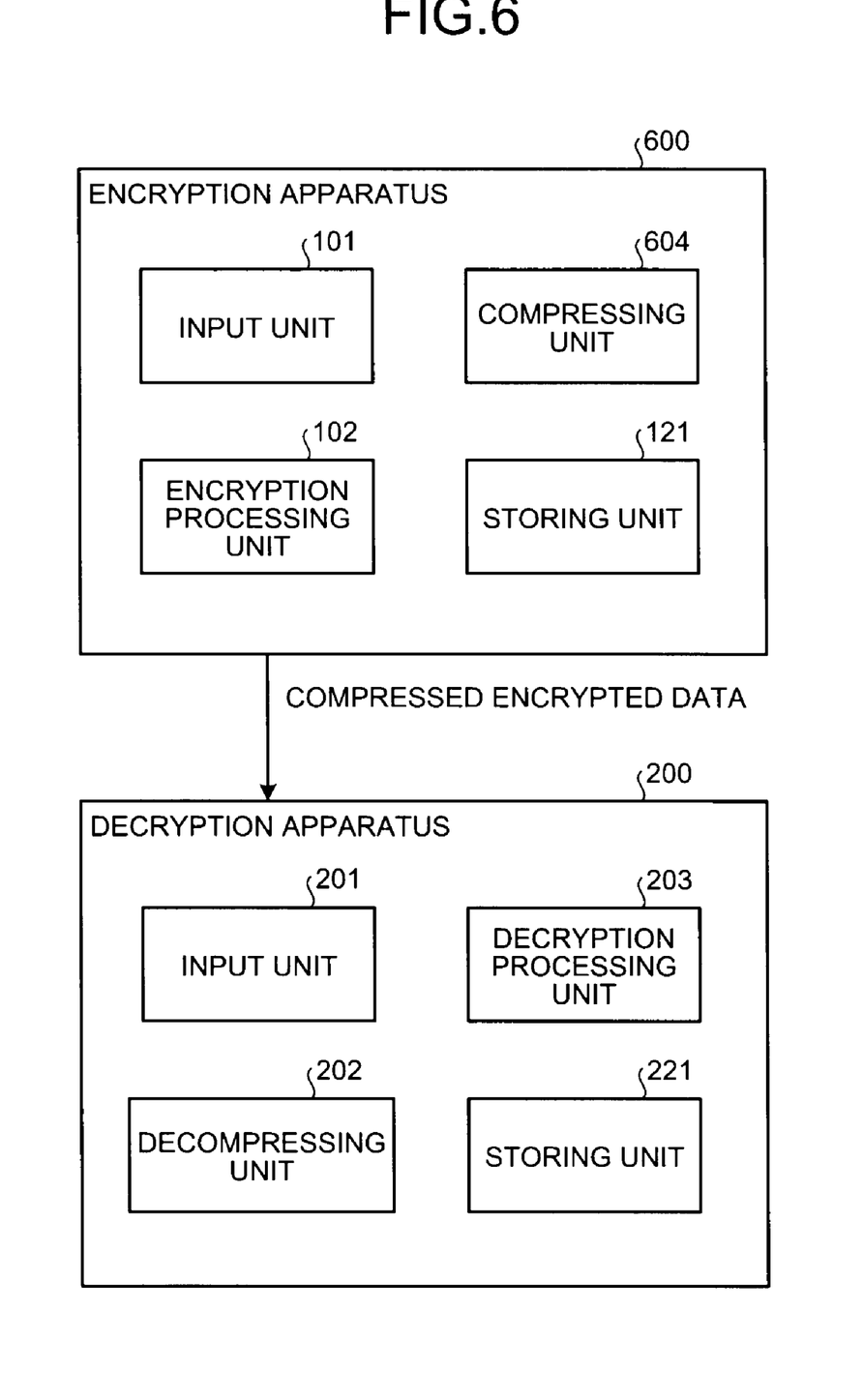
FIG. 6 is a block diagram of a configuration of a cipher processing system according to a second embodiment of the present invention.

As shown in FIG. 6, the cipher processing system according to the second embodiment includes an encryption apparatus 600 and a decryption apparatus 200.

As shown in the figure, the encryption apparatus 600 according to the second embodiment includes the input unit 101, an encryption processing unit 102, a compressing unit 604, and the storing unit 121.

In the second embodiment, that the determining unit 103 is deleted and the function of the compressing unit 604 are different from those in the first embodiment. Other components and functions are the same as those of the encryption apparatus 100 according to the first embodiment shown in FIG. 1. Therefore, the components and the functions are denoted by the same reference numerals and signs, and explanation thereof is omitted.

The compressing unit 604 outputs compressed encrypted data obtained by compressing the encrypted data, which is output from the encryption processing unit 102, according to a cipher compression technique using an algebraic torus.

The compressing unit 104 according to the first embodiment converts projective representation into affine representation according to the procedure indicated by Formula (36) as explained above. In a procedure 2.1 of Formula (36), an inverse element $\beta^{-1}$ of $\beta$, which is an element of the finite field $F_{q^3}$, is calculated. When $\beta$ is a zero element, an inverse element cannot be calculated. Therefore, affine representation corresponding thereto is calculated by determination processing indicated by a procedure 1 of Formula (36).

The compressing unit 604 according to the second embodiment uses a zero element of the finite field $F_{q^3}$ as a value of an inverse element of a zero element of the finite field $F_{q^3}$. This makes it possible to omit determination processing in the procedure 1 of Formula (36) and convert projective representation into affine representation with only a procedure 2. In other words, if the inverse element $\beta^{-1}$ of $\beta=0$ is 0, $\gamma$ of the procedure 2.1 is 0. Then, (0, 0) is calculated from the procedure 2.2 as (u1, u2) satisfying $\gamma=u_0+u_1y+u_2y_2=0$. This is the same as a result obtained by executing the procedure 1 in the first embodiment.

Figure 7:
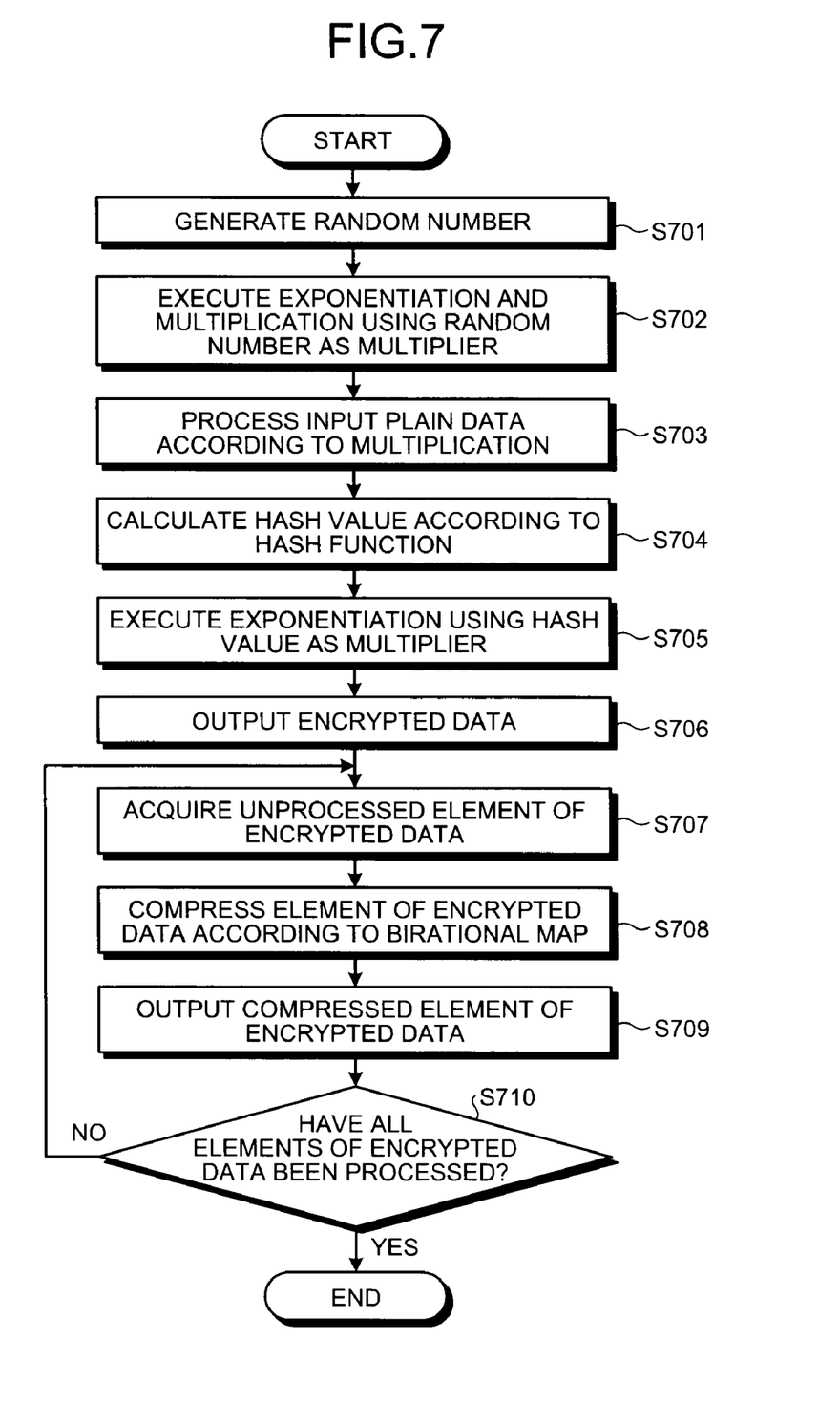
FIG. 7 is a flowchart of an overall flow of encryption processing in the second embodiment.

Encryption processing by the encryption apparatus 600 according to the second embodiment is explained with reference to FIG. 7.

Random number generation processing, and encrypted data calculation processing at Steps S701 to S707 are the same as the processing at Steps S401 to S407 in the encryption apparatus 100 according to the first embodiment. Therefore, explanation of these kinds of processing is omitted.

Figure 4:
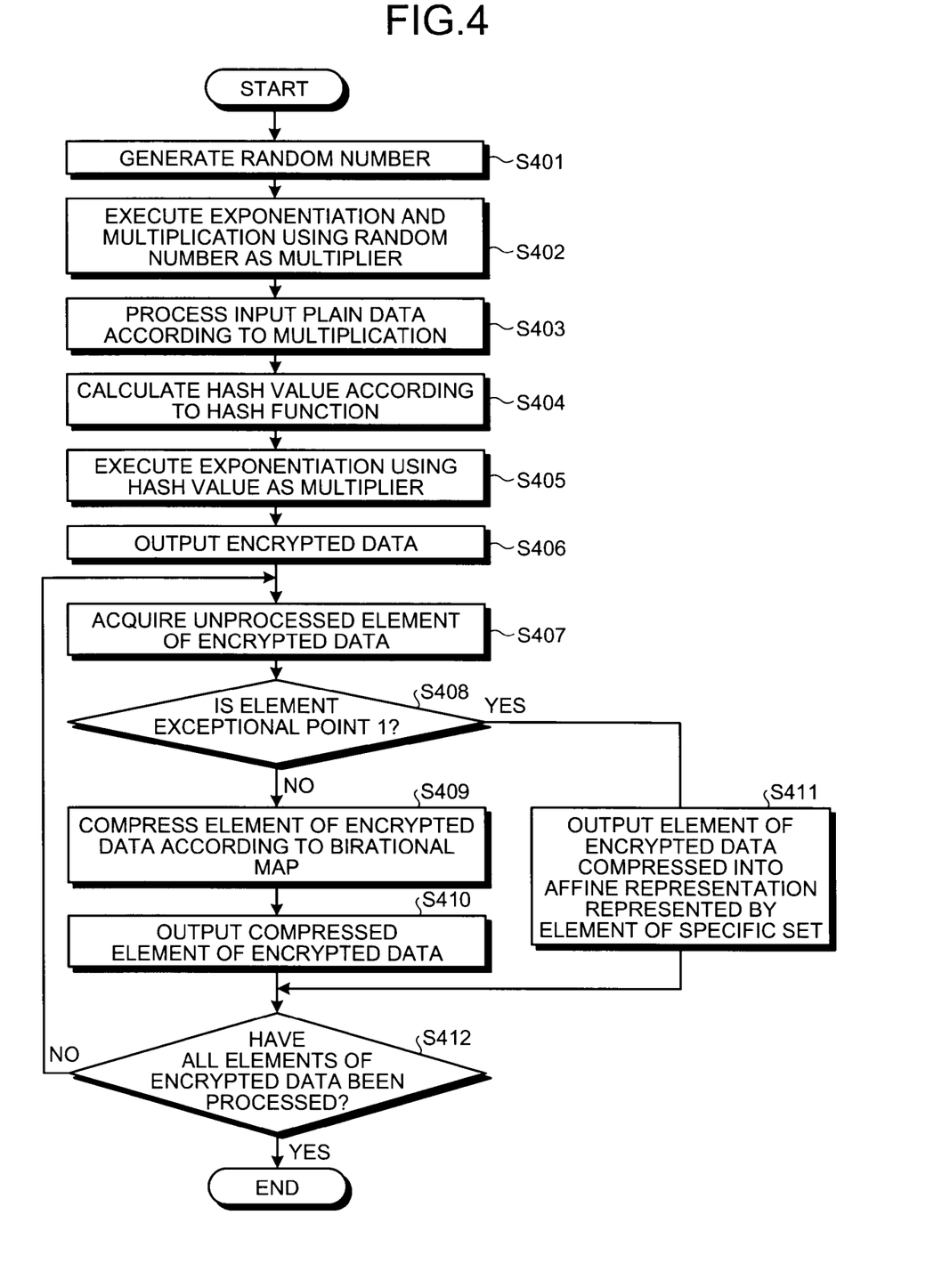
FIG. 4 is a flowchart of an overall flow of encryption processing in the first embodiment.

In the second embodiment, Step S408 in FIG. 4 as processing for determining, with the determining unit 103, whether an element of encrypted data is an exceptional point and Step S411 for outputting affine representation corresponding to a determination result are deleted.

Instead of the steps, the compressing unit 604 executes processing for compressing an element of encrypted data according to the birational map ρ using a zero element of the finite field $F_{q^3}$ as an inverse element of the zero element of the finite field $F_{q^3}$ (Step S708).

Compressed encrypted data output processing at Step S709 and end determination processing at Step S710 are the same as the processing at Steps S410 and S412 in the encryption apparatus 100 according to the first embodiment. Therefore, explanation of these kinds of processing is omitted.

As explained above, in the second embodiment, a random number is generated and the processing is repeated until all target elements to be compressed become normal points. Therefore, it is possible to generate compressed encrypted data including, as elements, only the affine representation compressed by the birational map ρ.

As explained above, in the cipher processing system according to the second embodiment, the encryption apparatus executes, using, as a zero element, an inverse element of a zero element of a predetermined finite field representing an element on an algebraic torus, processing for conversion from projective representation into affine representation. This makes it unnecessary to perform, in the conversion processing, processing for determining whether an element on a torus represented in the projective representation is an exceptional point.

Hardware configuration of the encryption apparatuses and the decryption apparatuses according to the first and the second embodiments will be described. The encryption apparatuses and the decryption apparatuses according to the first and second embodiments include control devices such as central processing units (CPUs), storage devices such as read only memories (ROMs) and random access memories (RAMs), communication interfaces (I/Fs) connected to a network to perform communication, and buses that connect the devices.

Information processing programs executed in the encryption apparatuses or the decryption apparatuses according to the first and second embodiments are incorporated in the ROMs and the like in advance and provided.

The information processing programs executed in the encryption apparatuses or the decryption apparatuses according to the first and second embodiments can be recorded in computer-readable recording media such as compact disk-read only memories (CD-ROMs), flexible disks (FDs), compact disk recordables (CD-Rs), and digital versatile disks (DVDs) as files in an installable format or an executable format and provided.

The information processing programs executed in the encryption apparatuses or the decryption apparatuses according to the first and second embodiments are formed as modules including the units explained above (the input unit, the encryption processing unit, the determining unit, and the compressing unit or the input unit, the decompressing unit, and the decryption processing unit). As actual hardware, the CPUs read out the information processing programs from the ROMs and execute the information processing programs, whereby the units are loaded onto main storage devices and generated on the main storage devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus, comprising:
   an arithmetic processing unit that executes a predetermined arithmetic operation and outputs an arithmetic result as an element on an algebraic torus; and
   a compressing unit that outputs an element belonging to a specific set as a compression result of the arithmetic result, when the arithmetic result is an exceptional point representing an element on the algebraic torus that cannot be compressed by a compression map for compressing an element on the algebraic torus into an affine representation, the specific set being predetermined and does not overlap a set to which the compression result obtained by compressing the arithmetic result, which is not the exceptional point, according to the compression map belongs.

2. The apparatus according to claim 1, wherein the compressing unit outputs, when the arithmetic result is not the exceptional point, a compression result obtained by compressing the arithmetic result according to the compression map.

3. The apparatus according to claim 1, further comprising a determining unit that determines whether the arithmetic result is the exceptional point, wherein
the compressing unit outputs, when it is determined by the determining unit that the arithmetic result is the exceptional point, an element belonging to the specific set as the compression result.

4. The apparatus according to claim 1, wherein
the element of the algebraic torus is represented by an element on a predetermined finite field,
the compression map is a map for calculating an inverse element of the element on the finite field representing the element on the algebraic torus and compressing the element on the algebraic torus into the affine representation using the calculated inverse element, and
the compressing unit outputs, when the arithmetic result is the exceptional point represented by a zero element on the finite field that is an element, an inverse element of which cannot be calculated, the compression result as an element belonging to the specific set by compressing the arithmetic result into the affine representation according to the compression map using the zero element as an inverse element of the zero element.

5. The apparatus according to claim 1, wherein the specific set is a set including elements obtained by excluding, from a two-dimensional affine space on a predetermined finite field, an element obtained by compressing elements other than a unit element on the algebraic torus according to the compression map.

6. The apparatus according to claim 1, wherein the specific set includes an element converted into the exceptional point according to a decompression map corresponding to the compression map.

7. The apparatus according to claim 1, wherein the arithmetic processing unit outputs the arithmetic result that is encrypted data obtained by encrypting plain data according to cryptography based on a discrete logarithm problem on the algebraic torus.

8. A non-transitory computer readable medium including programmed instructions for performing information processing, wherein the instructions, when executed by a computer, cause the computer to perform:
executing a predetermined arithmetic operation and outputting an arithmetic result as an element on an algebraic torus; and
outputting an element belonging to a specific set as a compression result of the arithmetic result, when the arithmetic result is an exceptional point representing an element on the algebraic torus that cannot be compressed by a compression map for compressing an element on the algebraic torus into affine representation, the specific set being predetermined and does not overlap a set to which a compression result obtained by compressing the arithmetic result, which is not the exceptional point, according to the compression map belongs.

* * * * *